US010034206B2

(12) United States Patent
Wong et al.

(10) Patent No.: US 10,034,206 B2
(45) Date of Patent: Jul. 24, 2018

(54) CONTROLLING COMMUNICATIONS IN A MULTI-CARRIER WIRELESS COMMUNICATION SYSTEM

(75) Inventors: Shin Horng Wong, Chippenham (GB); Nicola Puddle, Swindon (GB); Graham Brend, Bath (GB)

(73) Assignee: WSOU Investments, LLC, Los Angeles, CA (US)

( * ) Notice: Subject to any disclaimer, the term of this patent is extended or adjusted under 35 U.S.C. 154(b) by 433 days.

(21) Appl. No.: 13/639,242

(22) PCT Filed: Mar. 16, 2011

(86) PCT No.: PCT/EP2011/001292
§ 371 (c)(1),
(2), (4) Date: Jan. 9, 2013

(87) PCT Pub. No.: WO2011/124314
PCT Pub. Date: Oct. 13, 2011

(65) Prior Publication Data
US 2013/0121167 A1 May 16, 2013

(30) Foreign Application Priority Data

Apr. 6, 2010 (EP) .................................. 10360017
Aug. 9, 2010 (EP) .................................. 10360034

(51) Int. Cl.
*H04W 76/20* (2018.01)
*H04W 36/06* (2009.01)
(52) U.S. Cl.
CPC .......... *H04W 36/06* (2013.01); *H04W 76/20* (2018.02)
(58) Field of Classification Search
CPC ............... H04W 72/04; H04W 72/042; H04W 72/0406; H04W 72/02; H04W 76/064;
(Continued)

(56) References Cited

U.S. PATENT DOCUMENTS

2003/0088695 A1  5/2003  Kwak et al.
2006/0280142 A1* 12/2006  Damnjanovic et al. ...... 370/329
(Continued)

FOREIGN PATENT DOCUMENTS

CN  101128038 A  2/2008
CN  101547477 A  9/2009
(Continued)

OTHER PUBLICATIONS

R2-101261, 3GPP TSG-RAN WG2 Meeting #69, 4C-HSDPA: Mobility & Radio Link Failure, Alcatel-Lucent et al., San Francisco, CA, USA, Feb. 22-26, 2010, 2 pages.
(Continued)

*Primary Examiner* — Phong La
(74) *Attorney, Agent, or Firm* — Sean D. Burdick

(57) ABSTRACT

A method of controlling communication between a first network node and a second network node in a multi-carrier wireless communications system, network nodes and a computer program product are disclosed. The method of controlling communication between a first network node and a second network node in a multicarrier wireless communications system in which a predetermined set of a plurality of carriers are utilized to support communication between the first network node and the second network node, the predetermined set of the plurality of carriers comprising a primary carrier and at least one secondary carrier, comprises the steps of: determining an occurrence of an event requiring a change in the primary carrier; indicating to a third network node that a physical layer instruction is to be transmitted between said first network node and the second network node; and transmitting a physical layer instruction between the first network node and the second network node, the physical layer instruction encoding reselection information to cause the second network node to select a different carrier
(Continued)

from the plurality of carriers as a new primary carrier. By sending the instruction using the layer one or physical layer, the speed at which the instruction can be transmitted between the network nodes is vastly increased, which enables fast switching to occur, thereby preventing a loss of communications between the network nodes. By indicating to a third network node that a physical layer instruction is to be transmitted between the first network node and the second network node, maintenance of synchronization is simplified and unpredictable network behavior is minimized.

14 Claims, 11 Drawing Sheets

(58) Field of Classification Search
CPC ... H04W 52/325; H04W 52/44; H04W 36/06; H04W 36/08; H04W 76/20
See application file for complete search history.

(56) References Cited

U.S. PATENT DOCUMENTS

| | | | | |
|---|---|---|---|---|
| 2009/0010208 A1* | 1/2009 | Ishizaki | ............... | H04L 1/0007 370/328 |
| 2009/0257387 A1* | 10/2009 | Gholmieh et al. | ............ | 370/329 |
| 2009/0316575 A1* | 12/2009 | Gholmieh et al. | ............ | 370/225 |
| 2010/0278130 A1* | 11/2010 | Sambhwani | ...... | H04W 72/0453 370/329 |
| 2011/0020054 A1* | 1/2011 | Vaillancourt | ........... | C30B 35/00 403/30 |
| 2011/0021154 A1* | 1/2011 | Marinier et al. | ........... | 455/67.11 |
| 2011/0317552 A1* | 12/2011 | Lee | ..................... | H04L 27/2601 370/228 |
| 2014/0233396 A1* | 8/2014 | Marinier et al. | .............. | 370/242 |

FOREIGN PATENT DOCUMENTS

| | | |
|---|---|---|
| CN | 101611570 A | 12/2009 |
| WO | WO 2009/155480 A1 | 12/2009 |
| WO | WO 2010/024591 A2 | 3/2010 |
| WO | WO 2011/059373 A1 | 5/2011 |

OTHER PUBLICATIONS

R1-101296, 3GPP TSG RAN WG1 Meeting #60, Uplink Load Balancing for 4C-HSDPA, Ericsson et al., San Francisco, CA, USA, Feb. 22-26, 2010, 2 pages.
R2-101352, 3GPP TSG-RAN WG2 #69, CC Management for Carrier Aggregation, Intel Corporation, San Francisco, CA, USA, Feb. 22-26, 2010, 4 pages.
R1-101841, 3GPP TSG-RAN WG1 Meeting #60BIS, Fast Primary Carrier Change in 4C-HSDPA, Alcatel-Lucent et al., Beijing, China, Apr. 12-16, 2010, 2 pages.
International Search Report for PCT/EP2011/001292 dated Sep. 13, 2011.
European Search Report for EP 10 36 0034 dated Aug. 4, 2011.
Notice of Reason for Refusal for corresponding Japanese Application No. 2013-503023, dated Nov. 26, 2013, 5 pages.
QUALCOMM Europe, "Cell Search and Association with Carriers," 3GPP TSG-RAN WG2 Meeting #63, Jeju Island, Korea, Aug. 18-22, 2008, R2-084403, Agenda item: 7.5.11, Document for: Discussion, 4 pages.

* cited by examiner

TRADITIONAL UMTS ARCHITECTURE

CONTROLLING COMMUNICATIONS IN A MULTI-CARRIER WIRELESS COMMUNICATION SYSTEM

FIELD OF THE INVENTION

The present invention relates to a method of controlling communication between a first network node and a second network node in a multi-carrier wireless communications system, network nodes and a computer program product.

BACKGROUND

Single carrier wireless telecommunications systems are known. In those known systems, radio coverage is provided to user equipment, for example, mobile telephones, by geographical area. A base station is located in each geographical area to provide the required radio coverage. User equipment in the area served by a base station receives information and data from the base station and transmits information and data to the base station. In a high-speed downlink packet access (HSDPA) telecommunications network, data and information is sent between user equipment and a base station in data packets on a radio frequency carrier.

Information and data transmitted by the base station to the user equipment occurs on radio frequency carriers known as downlink carriers. Information and data transmitted by user equipment to the base station occurs on radio frequency carriers known as uplink carriers.

In known wireless telecommunication systems operating in single carrier mode, user equipment can move between geographical base station coverage areas. Service provided to user equipment is overseen by a radio network controller (RNC). The radio network controller communicates with user equipment and base stations and determines which base station each user equipment is primarily connected to. Furthermore, a radio network controller acts to control and communicate with a base station and user equipment when user equipment moves from the geographical area served by one base station to a geographical area served by another base station.

It has been proposed to allow base stations and user equipment to each transmit simultaneously on more than one carrier. Furthermore it has been proposed to allow user equipment and base stations to receive simultaneously on more than one carrier frequency. Each carrier, both uplink and downlink, is typically independently power controlled by a base station. Provision of more than one downlink carrier, for example, on four frequency carriers, allows for an increase in data throughput to the user equipment. Networks having more than two carriers may be referred to as "multi cell high speed downlink packet access" (MC-HS-DPA) networks. The term "multi-carrier" network used herein is envisaged to cover the case where two, three, four, or more downlink (or uplink) carriers are provided for in a network.

Provision of multi-carrier functionality may have associated problems. Accordingly, it is desired to improve the operation of a wireless telecommunications network having multi-carrier functionality.

SUMMARY

According to a first aspect, there is provided a method of controlling communication between a first network node and a second network node in a multicarrier wireless communications system in which a predetermined set of a plurality of carriers are utilised to support communication between the first network node and the second network node, the predetermined set of the plurality of carriers comprising a primary carrier and at least one secondary carrier, the method comprising the steps of: determining an occurrence of an event requiring a change in the primary carrier; indicating to a third network node that a physical layer instruction is to be transmitted between the first network node and the second network node; and transmitting a physical layer instruction between the first network node and the second network node, the physical layer instruction encoding reselection information to cause the second network node to select a different carrier from the plurality of carriers as a new primary carrier.

The first aspect recognises that a problem with existing techniques utilised in multi-carrier systems is that the primary carrier carries essential control channels and the network node will declare a radio link failure if the primary carrier fails. Those existing techniques enable the primary carrier to be changed using a radio bearer reconfiguration or other radio resource control (RRC) signalling from a radio network controller. However, the first aspect also recognises that this process is slow and may not be sufficient in the event that user equipment loses its radio link connection quickly or if a fast primary carrier change is required to, for example, quickly manage loading between the carriers, in which case communication between the network nodes may be lost.

Accordingly, a method of controlling communication between a first network node and a second network node in a multi-carrier wireless communication system in which predetermined sets of carriers are used to support communications between the nodes is provided. The set of carriers include a primary carrier and one or more secondary carriers. An event requiring a change of primary carrier is detected. It will be appreciated that such an event may occur due to a wide variety of circumstances. When the need to change primary carrier has been detected, a physical layer or layer 1 instruction is transmitted between the network nodes. The physical layer instruction encodes information which instructs the second network node to change to a new primary carrier. By sending the instruction using the layer 1 or physical layer, the speed at which the instruction can be transmitted between the network nodes is vastly increased, which enables fast switching to occur, thereby preventing a loss of communications between the network nodes.

The first aspect recognises that by indicating to a third network node that a physical layer instruction is to be transmitted between the first network node and the second network node, a network can be readily informed about changes made in communication regime between the first and second network node. By transmitting information relating to the physical layer instruction more widely, unpredictability within the network can be minimised. It may be, for example, that the third network node may itself be operable to cause the second network node to select a different carrier from the plurality of carriers as a new primary carrier. If the third network node is unaware of an instruction sent by the first network node, it may itself instruct a change and the second network node may receive conflicting information. In particular, the first and third network nodes may lose synchronisation on the mobility status of the second network node, and the second network node may receive conflicting instructions. Use of signalling more widely between network nodes allows an increase in robustness of the overall procedure and helps to avoid misalignment regarding the mobility status of the second network node.

In one embodiment, the first network node is a base station, the second network node is an item of user equipment and the third network node is an RNC (remote network controller) or similar network co-ordination node, for example, a mobility management entity (MME).

In one embodiment, a MAC message is used in place of a physical layer message. Accordingly, any message which is decodable by the first network node can be utilised successfully and may offer improved speed of primary carrier change over use of RRC signalling from an RNC. In such embodiments, the first network node is effectively informed of an occurrence of an event requiring a change in the primary carrier.

In one embodiment, the step of determining comprises receiving a notification of the event from the second or third network node. Accordingly, a base station, for example, may receive notification of a triggering event from either user equipment or from an RNC.

In one embodiment, the step of indicating occurs prior to the step of transmitting. Accordingly, notification of a possible change may propagate through a network before that change is made.

In one embodiment, the step of indicating comprises requesting to perform the transmitting step. Accordingly, rather than unilaterally making a change, the first network node may request permission, or a clear instruction from a third network node, thereby mitigating the chances of inducing misalignment in a network.

In one embodiment, the method further comprises the step of awaiting an instruction to perform the transmitting step prior to performing the transmitting step. Accordingly, a node elsewhere in the network may retain control and visibility over the process.

In one embodiment the method further comprises the step of monitoring for an indication of safe receipt of the physical layer instruction. Accordingly, by monitoring for an indication of safe receipt of the physical layer instruction, it will be understood that visibility of the process of selection of a different carrier can be maintained and that the status of the second network node can be more fully understood by the first network node.

In one embodiment the method further comprises the step of indicating to the third network node that an indication of safe receipt has been received. Accordingly, a network may be kept informed of the progress of the selection of a different carrier by the second network node.

In one embodiment, the physical layer instruction encodes reselection information to cause the second network node to select a different carrier from the set of the plurality of carriers as the new primary carrier. Accordingly, the instruction instructs the second network node to select one of the carriers within the set of carriers being utilised by the second network node as the new primary carrier.

In one embodiment, the physical layer instructions encodes reselection information to cause the second network node to select a predetermined carrier from the set of the plurality of carriers as the new primary carrier. Accordingly, the instruction may encode information which instructs the second network node to select a particular carrier from the set of carriers as the new primary carrier. It will be appreciated that this provides a particularly efficient and convenient technique for identifying the new primary carrier to be selected.

In one embodiment, the physical layer instruction encodes reselection information to cause the second network node to deselect the primary carrier. Accordingly, the second network node may be instructed to deselect the current primary carrier in order cause a change in primary carrier.

In one embodiment, the physical layer instruction is transmitted using the new primary carrier. Accordingly, the instruction itself may not need to explicitly identify the new primary carrier at all. Instead, the designation of the new primary carrier may be inferred by receiving the instruction on the carrier which is to be used as the new primary carrier. It will be appreciated that this avoids having to create a new physical layer or layer one instruction.

In one embodiment, the method comprises the step of: transmitting preconfiguration information to the second network node to enable the second network node to support communication using at least one other primary carrier. Accordingly, the second network node may be provisioned with information to enable that network node to utilise different carriers. In this way, not only can a primary carrier be selected from an existing set of carriers, the primary carrier can even be selected from a different set of carriers which may be provided on different frequencies.

In one embodiment, the physical layer instruction comprises a High Speed Shared Control Channel (HS-SCCH) order encoding the reselection information. It will be appreciated that an HS-SCCH order provides a particularly convenient mechanism for the transmission of the instruction.

In one embodiment, the step of determining an occurrence of an event comprises detecting a radio link failure. Accordingly, the occurrence of an actual or impending radio link failure may be detected which initiates a change in primary carrier, thereby enabling communications between the first and second network nodes to continue.

In one embodiment, the step of determining an occurrence of radio link failure comprises receiving an indication from the second network node of a radio link failure.

Accordingly, the detection of a potential radio link failure may be determined based on information provided by the second network node. It will be appreciated that the detection of potential radio link failure may be derived either explicitly or implicitly from information provided by the second network node.

In one embodiment, the indication is encoded in at least one of a radio relocation control message and an Enhanced Dedicated Channel Transport Format Combination Identifier. Accordingly, the indication from the second network node may come either via a radio relocation control message or via an enhanced dedicated channel transport format combination identifier. It will be appreciated that the detection via a radio relocation control message may need to occur earlier since this occurs via a higher layer, which may not be fast enough if the detection is not performed early enough. However, the enhanced dedicated channel transport format combination identifier occurs at the physical or layer one level and so can be transmitted much more quickly. Analogously, an Uplink Order Request message, sent at layer 1 or MAC, may be used, which also can be transmitted much more quickly to identify possible radio link failure.

In one embodiment, the indication is encoded in at least one of a Radio Relocation Control message and an Enhanced Dedicated Channel Transport Format Combination Identifier. The measurement reports may be received via the radio relocation control message and so may need to be transmitted early enough to enable the switching to occur. However, the channel quality information, which indicates the throughput that the network node can support based on the quality of the radio link on each carrier is sent at the physical or layer one level by the high speed dedicated physical control channel for each carrier. The channel quality information is sent periodically and usually at a higher rate than that of the measurement reports. Since channel quality information may be interpreted at the first network node, the network node can make a decision on whether to change the primary carrier. In embodiments, the second network node can implicitly warn the first network node of a possible radio link failure by sending a predetermined value of carrier control quality information (such as, for example, "0" or another predetermined value for the primary carrier even if the channel quality information is above 0 or a different value). Again, it will be appreciated that this provides a particularly fast and efficient technique for changing primary carrier. In embodiments, the channel quality information indicators can be used to offer an indication of ranking of suitability of available secondary carriers for use as a replacement primary carrier. Provision of such information may allow an intelligent choice of new primary carrier candidate to be made.

In one embodiment, the method further comprises the steps of determining that an event requiring a change in the primary carrier is no longer occurring; and not transmitting the physical layer instruction between the first network node and the second network node. Accordingly, if normal operation resumes before a physical layer instruction to change primary carrier is sent, the proposed change can be cancelled, or the change order never sent.

In one embodiment, the first network node comprises a base station and the second network node comprises user equipment.

According to a second aspect, there is provided a network node operable to control communication with a second network node in a multicarrier wireless communications system in which a predetermined set of a plurality of carriers are utilised to support communication between the network node and the second network node, the predetermined set of the plurality of carriers comprising a primary carrier and at least one secondary carrier, the network node comprising: determination logic operable to detect an occurrence of an event requiring a change in the primary carrier; indication logic operable to indicate to a third network node that a physical layer instruction is to be transmitted to the second network node; and transmission logic operable to transmit a physical layer instruction between the network node and the second network node, the physical layer instruction encoding reselection information to cause the second network node to select a different carrier from the plurality of carriers as a new primary carrier.

In one embodiment, the determination logic is operable to receive a notification of the event from the second or third network node.

In one embodiment, the indication logic is operable to perform the step of indicating prior to the step of transmitting.

In one embodiment, the indication logic is operable to request to perform said transmitting step.

In one embodiment, the transmission logic is operable to await an instruction to transmit, prior to transmitting a physical layer instruction.

In one embodiment, the network node further comprises monitoring logic operable to monitor for an indication of safe receipt of the physical layer instruction.

In one embodiment, the monitoring logic is further operable to indicate to the third network node that an indication of safe receipt has been received.

In one embodiment, the physical layer instruction encodes reselection information to cause the second network node to select a different carrier from the set of the plurality of carriers as the new primary carrier.

In one embodiment, the physical layer instructions encodes reselection information to cause the second network node to select a predetermined carrier from the set of the plurality of carriers as the new primary carrier.

In one embodiment, the physical layer instruction encodes reselection information to cause the second network node to deselect the primary carrier.

In one embodiment, the transmission logic is operable to transmit the physical layer instruction using the new primary carrier.

In one embodiment, the transmission logic is operable to transmit preconfiguration information to the second network node to enable the second network node to support communication using at least one other primary carrier.

In one embodiment, the physical layer instruction comprises a High Speed Shared Control Channel order encoding the reselection information.

In one embodiment, the determination logic is operable to detecting a radio link failure.

In one embodiment, the determination logic is operable to detect a radio link failure from an indication received from the second network node.

In one embodiment, the indication is encoded in at least one of a Radio Relocation Control message and an Enhanced Dedicated Channel Transport Format Combination Identifier.

In one embodiment, the indication comprises at least one of a measurement report and a channel quality indicator received from the second network node and from which radio link failure is determined.

According to a third aspect, there is provided a network node operable to communicate with a first network node in a multicarrier wireless communications system in which a predetermined set of a plurality of carriers are utilised to support communication between the network node and the first network node, the predetermined set of the plurality of carriers comprising a primary carrier and at least one secondary carrier, the network node comprising: reception logic operable to receive a physical layer instruction encoding reselection information from the first network node; and reselection logic operable in response to the reselection information to select a different carrier from the plurality of carriers as a new primary carrier.

In one embodiment, the network node further comprises notification logic operable to provide a notification of an occurrence of an event requiring a change in the primary carrier.

In one embodiment, the network node further comprises safe receipt logic operable to provide an indication of safe receipt of the physical layer instruction to the first network node if it has been safely received.

In one embodiment, the reselection logic is operable, in response to the reselection information, to select a different carrier from the set of the plurality of carriers as the new primary carrier.

In one embodiment, the reselection logic is operable, in response to the reselection information, to select a predetermined carrier from the set of the plurality of carriers as the new primary carrier.

In one embodiment, the reselection logic is operable, in response to the reselection information, to deselect the primary carrier.

In one embodiment, the reselection logic is operable to select that carrier on which the physical layer instruction is received as the new primary carrier.

In one embodiment, the reception logic is operable to receive preconfiguration information to enable the second network node to support communication using at least one other primary carrier.

In one embodiment, the physical layer instruction comprises a High Speed Shared Control Channel order encoding the reselection information.

In one embodiment, the network node comprises failure logic operable to provide an indication of an event requiring a change in the primary carrier.

In one embodiment, the failure logic is operable to detect a radio link failure.

In one embodiment, the failure logic is operable to encode the indication in at least one of a Radio Relocation Control message and an Enhanced Dedicated Channel Transport Format Combination Identifier.

In one embodiment, the indication comprises at least one of a measurement report and a channel quality indicator.

According to a fourth aspect, there is provided a computer program product operable, when executed on a computer, to perform the method steps of the first aspect.

According to a further aspect, there is provided a method of encoding carrier change information between a first network node and a second network node in a multicarrier wireless communications system in which a predetermined set of a plurality of carriers are utilised to support communication between the first network node and the second network node, the predetermined set of the plurality of carriers comprising a primary carrier and at least one secondary carrier, the method comprising the steps of: determining an occurrence of an event requiring a change in the primary carrier; identifying a carrier from said plurality of carriers as a candidate for a new primary carrier; and transmitting an encoded message including an indication of an occurrence of said event and a candidate for a new primary carrier.

A yet further aspect provides a network node operable to communicate with a first network node in a in a multicarrier wireless communications system in which a predetermined set of a plurality of carriers are utilised to support communication between the first network node and the second network node, the predetermined set of the plurality of carriers comprising a primary carrier and at least one secondary carrier, the network node comprising: event determination logic operable to determine an occurrence of an event requiring a change in the primary carrier; carrier candidate logic operable to identify a carrier from said plurality of carriers as a candidate for a new primary carrier; and transmission logic operable to transmit an encoded message including an indication of an occurrence of said event and a candidate for a new primary carrier.

Features of previous aspects are provided in combination with these further aspects.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DETAILED DESCRIPTION OF EMBODIMENTS

Figure 1:
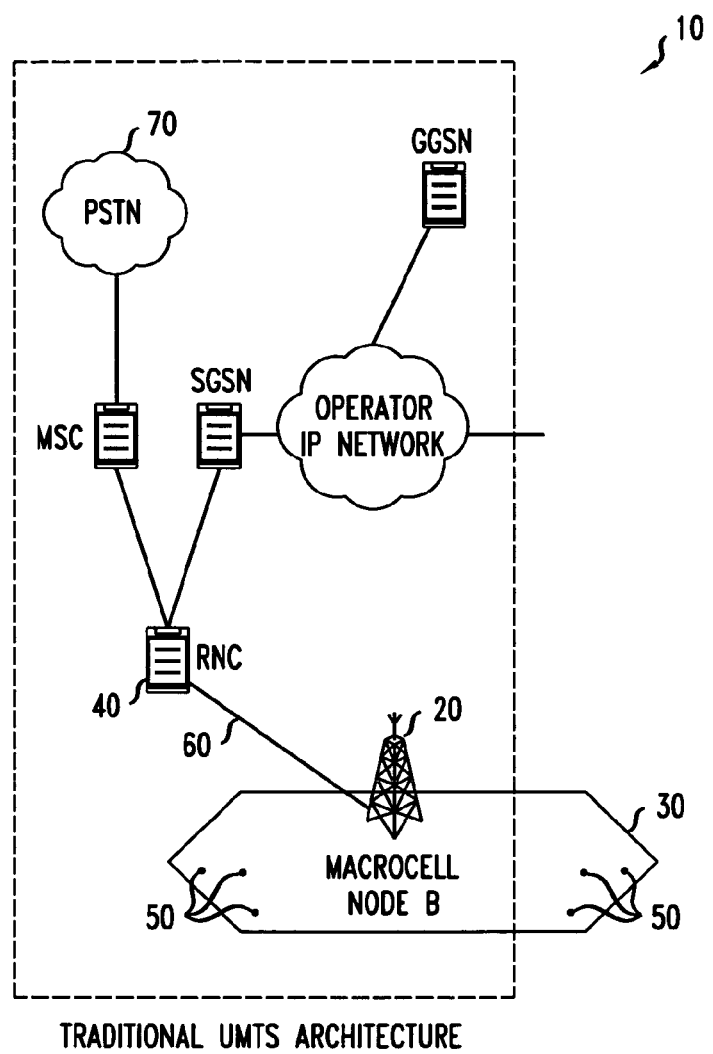
FIG. 1 illustrates a wireless telecommunications system 10 according to one embodiment.

FIG. 1 illustrates a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 20, communications may be established between the user equipment and the base station over associated radio links. Each base station typically supports a number of sectors within the geographical area of service 30.

Typically a different antenna within a base station supports each associated sector. Accordingly, each base station 20 has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The radio access network of the wireless communications system is managed by a radio network controller (RNC) 40. The radio network controller 40 controls operation of the wireless communications system by communicating with a plurality of base stations over a backhaul communications link 60. The network controller also communicates with user equipment 50 via each base station.

A radio network controller 40 maintains a neighbour list which includes information about geographical relationships between sectors supported by base stations 20. In addition, the radio network controller 40 maintains location information which provides information on the location of user equipment 50 within the wireless communication system 10. The radio network controller is operable to route traffic via circuit switched and packet switched networks. Hence, a mobile switching centre is provided with which the radio network controller may communicate. The mobile switching centre can communicate with a circuit switched network such as a public switched telephone network (PSTN) 70. Similarly, a network controller can communicate with serving general package radio service support nodes (SGSNs) and a gateway general packet radio service support node (GGSN). The GGSN can communicate with a packet switched core such as for example, the Internet.

User equipment 50 typically transmits information and data to a base station 20 so that it can be re-routed within a wireless telecommunications network. User equipment may, for example, need to transmit data to the base station in order to relay text messages, voice information when a user Is using the equipment to make a telephone call, or other data. The base station 20, in combination with parameters set by the radio network controller 40, allocates resources to user equipment in a manner that aims to optimise operation of the wireless telecommunications network 10.

In Universal Mobile Telecommunications System (UMTS), a Multi-Cell High Speed Downlink Packet Access (MC-HSDPA) arrangement is provided. In MC-HSDPA, a sector is defined as the geographical coverage area of a base station or Node B. A sector can consist of several cells, where each cell aims to cover the same geographical coverage as the sector and uses a separate frequency carrier for its transmission. The frequency carrier can be within the same frequency band or distributed over two frequency bands. MC-HSDPA is an extension to Dual Cell High Speed Downlink Packet Access (DC-HSDPA). In MC-HSDPA, user equipment can receive up to four simultaneous downlink transmissions from four different cells. Hence, MC-HSDPA can potentially double and quadruple the downlink throughput of DC-HSDPA and (Single Cell) HSDPA respectively. MC-HSDPA is also sometimes referred to as 4C-HSDPA (four Cell HSDPA) or 3C-HSDPA when the user equipment receives simultaneous transmissions from four or three cells respectively.

In a multi-carrier system, each carrier will have independent downlink radio links from a base station to user equipment. Those downlink radio links are managed independently since each carrier will likely have different radio propagation paths to user equipment. For HSDPA systems capable of operating in multi-carrier mode, more than two downlink carriers may be provided. It will be appreciated that in a multi-carrier network, the number of downlink carriers may not match the number of uplink carriers. Furthermore, the number of downlink carriers provided may not be exactly double the number of uplink carriers provided. In HSDPA multi-carrier mode, each sector served by a base station can have several carrier frequencies or "carriers" associated therewith. A carrier, or cell supported by a carrier, covers the same geographical region as a sector. Each cell is served by a different carrier frequency. It will therefore be understood that in a single carrier system, a cell is equivalent to a sector since a sector has only one cell or carrier frequency. Nonetheless, in a multi-carrier network each sector may comprise several cells each cell being served simultaneously by a different carrier frequency.

User equipment can be in Idle mode or in Radio Resource Control (RRC) Connected Mode. Cell_DCH state is one of the states within RRC Connected Mode where user equipment can transmit and receive high data throughput. The MC-HSDPA feature operates in Cell_DCH state, where in this state user equipment and Node B maintain physical layer synchronisations in the uplink and downlink. A Radio Link Failure (RLF) occurs when the user equipment loses its radio link connection due to loss of downlink physical layer synchronisation with the serving Node B. Radio link failure will cause the user equipment to exit the Cell_DCH state and thereby loose its high data throughput capability. In MC-HSDPA, a radio link failure will cause the user equipment to operate in a single cell with low throughput. Hence, the loss in throughput due to radio link failure may be much higher in MC-HSDPA compared to that in a single cell HSDPA operation. Radio link failure can have a significant impact on user experience, for example, 4C-HSDPA is typically used when a user is utilising a high bandwidth service, such as high quality video streaming.

In MC-HSDPA, the primary carrier is the cell that carries essential control channels and it cannot be deactivated. There is only one primary carrier and the other cells are called secondary carriers (e.g. Secondary Carrier 1, Secondary Carrier 2 and Secondary Carrier 3). The user equipment will declare radio link failure if the primary carrier radio link fails, even if the secondary carriers are working perfectly (e.g. if they are lightly loaded or if they have a better radio channel). The secondary carriers provide natural radio link redundancies but these redundancies cannot be utilised.

Although the primary carrier can be changed using Radio Bearer Reconfiguration or other RRC signalling from the radio network controller 40 this process is usually triggered using event 2x (and event 2x is one of a multitude of inter-frequency reporting events defined in 3GPP TS 25.331) and is usually slow. The trigger may not be sufficient in the event where user equipment is losing its radio link connection or if a fast primary carrier change is required (e.g. to quickly manage loading among the carriers). Since the process is slow, it is possible that UE will fall into radio link failure before it is able to trigger event 2x. Furthermore, use of Radio Bearer Reconfiguration or other RRC signalling requires UE to operate in Compress Mode (CM) which degrades UE reception.

Embodiments provide a technique to perform fast primary carrier change and use this to utilise the natural radio link redundancies provided by the secondary carriers in MC-HSDPA to give high radio link reliability for the user equipment thereby increases its robustness.

Primary Carrier Change—Overview

Upon detecting an event requiring a change in primary carrier, a primary carrier change is sent using a HS-SCCH order, which is layer one or physical layer instruction. Because the HS-SCCH order is a layer one or physical layer instruction, the change in primary carrier can be effected very quickly to enable a fast change to occur when, for example, rapid degradation in the primary carrier occurs or when load balancing between carriers is required. To enable such switching to occur, the user equipment is preconfigured for operation with any of the secondary carriers acting as a primary carrier. This is required since the HS-SCCH order bypasses the radio network controller 40 and therefore the radio access bearer (RAB) information required to configure the user equipment to operate in another primary carrier is not sent. In such RAB preconfiguration, the required RAB information is sent to the user equipment during setup (for example, when user equipment moves to a new serving Node B) for use if the relevant HS-SCCH order is sent. The HS-SCCH order may encode the change in carrier information using suitable bit fields of this order.

The HS-SCCH order will typically be sent on the secondary carrier that is selected by the Node B to be the potential primary carrier and the HS-SCCH order indicates that the existing primary carrier is deactivated. The advantages of this approach are that it avoids having to define a new HS-SCCH order (i.e. no extra signalling message required); the existing primary carrier is likely to be in a poor radio condition (hence the need to change it) and may not be received if transmitted on the primary carrier—however, since the HS-SCCH order comes from the potential primary carrier (i.e. one of the secondary carriers) that is likely to have a better radio condition, it has a higher chance of reaching the user equipment; in the same HS-SCCH order, in addition to changing the primary carrier, the Node B is able to activate/deactivate other secondary carrier(s); and fast primary carrier change is possible since the radio network controller 40 is bypassed.

Upon receiving the HS-SCCH order, the user equipment will send an acknowledgement to the Node B and proceed to change the primary carrier to the frequency carrier (i.e. one of the existing secondary carriers) specified by the Node B within a specified amount of time. When the primary carrier change is complete the user equipment will send a Primary Change confirmation message to the radio network controller 40. The Node B can also inform the radio network controller 40 of the change in primary carrier for that user equipment once it receives an acknowledgement from the user equipment. This can optionally save the user equipment from having to send a confirmation message to the radio network controller 40.

As will be mentioned in more detail below, in embodiments, the user equipment may defer changing the primary carrier for a predetermined period of time to avoid making unnecessary changes in primary carrier due to transient events. Should no change be necessary, then the user equipment will inform the Node B that no change to primary carrier occurred.

Event Detection

User equipment either explicitly or implicitly provides indicators which warn the network that a primary carrier change is required. Typically, the user equipment needs to warn the network of a possible need to change primary carrier before the event which could lead to loss or disruption in communications occurring. For example, the user equipment needs to warn of a possible radio link failure so that a change in primary carrier can be executed before radio link failure occurs.

Radio Link Failure

Figure 2:
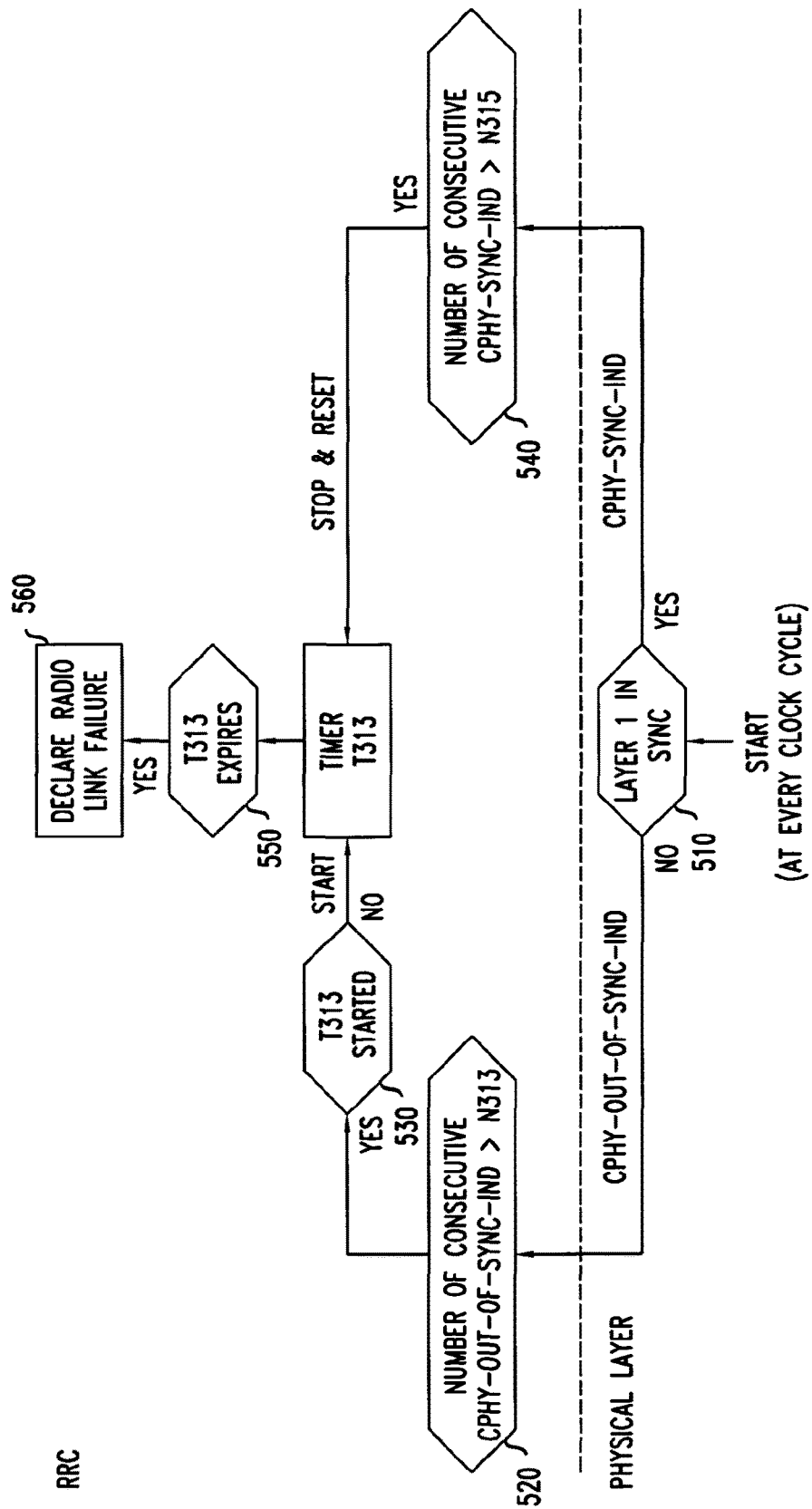
FIG. 2 illustrates a radio link failure evaluation performed by the user equipment according to one embodiment.

The radio link failure evaluation performed by the user equipment summarized in FIG. 2. At step S10, The user equipment in Cell_DCH continuously checks for downlink physical layer (layer 1) synchronisation by determining the quality of the downlink DPCCH (Dedicated Physical Control Channel) or F-DPCH (Fractional Dedicated Channel). If the user equipment is in sync, it will send an in-sync primitive, CPHY-Syn-IND and if the user equipment is out of sync, it will send an out-of-sync primitive, CPHY-Out-of-Sync-IND to the RRC layer.

At the RRC layer, the user equipment counts the number of consecutives CPHY-Out-of-Sync-IND primitive at step S20 and, if it is above a threshold N313, the timer T313 is started at step S30.

At step S40, timer T313 is stopped and reset if the RRC layer receives N315 consecutive CPHY-Syn-IND primitives from the physical layer.

At step S50 a determination is made of whether T313 has expired (typically after 3 seconds) and, if so, at step S60, the user equipment declares radio link failure.

If the user equipment is performing DRx (Discontinuous Reception) it does not send CPHY-Sync-IND or CPHY-Out-of-Sync-IND primitives. The counting leading up to N315 consecutive CPHY-Syn-IND or N313 consecutive CPHY-Out-of-Sync-IND primitives ignores missing sync primitives.

Explicit Radio Link Failure Warning

Figure 3:
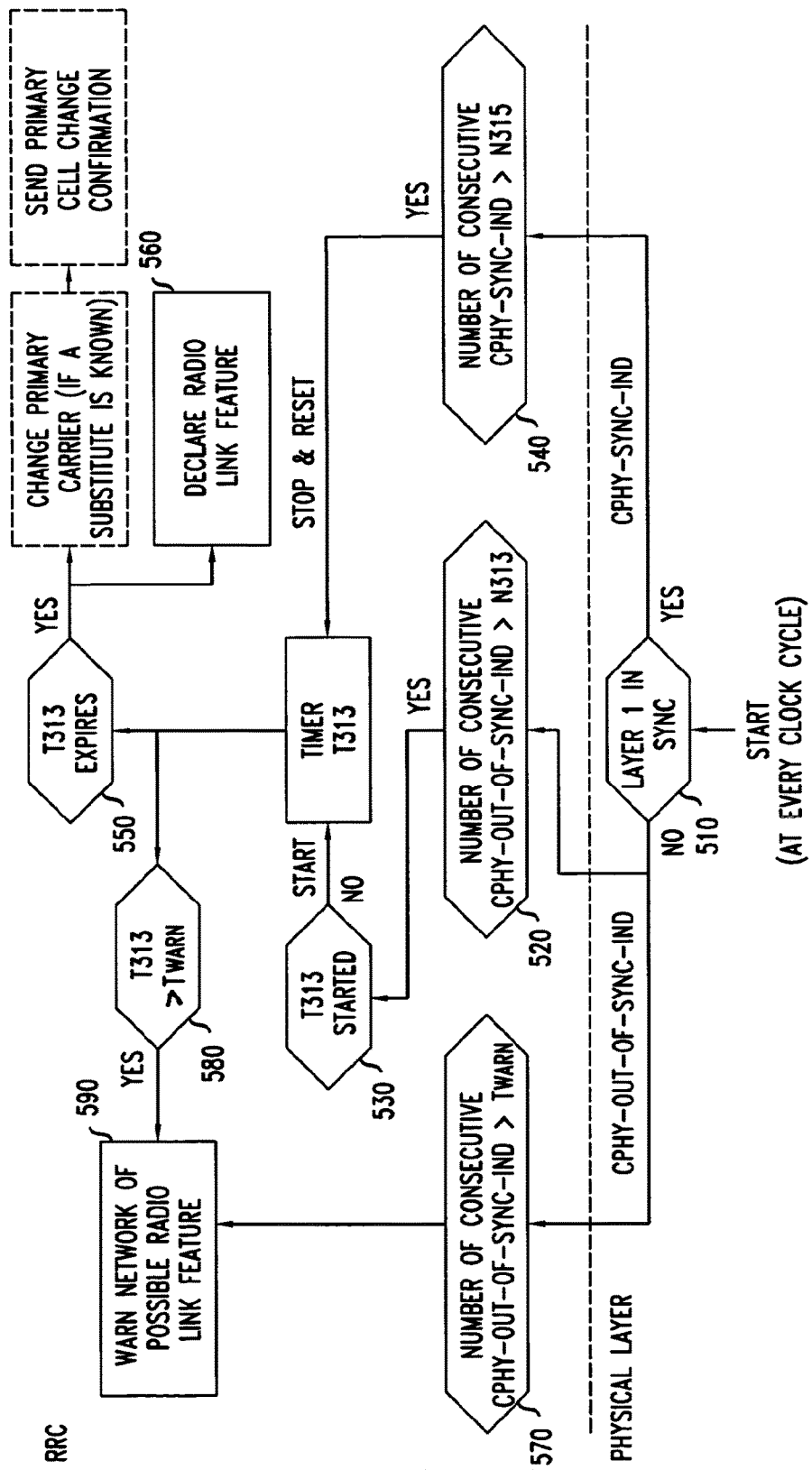
FIG. 3 illustrates an explicit radio link failure evaluation performed by the user equipment according to one embodiment.

FIG. 3 shows an embodiment where an explicit warning can be sent to the network. The warning is sent at step S90 and occurs as soon as $N_{WARN}$ CPHY-Out-of-Sync-IND consecutive primitives have been determined at step S70 to be received from the physical layer. If $N_{WARN}$ is set smaller than N313, an early warning will be provided allowing the network to change the user equipment's primary carrier faster.

This can lead to less service interruption since user equipment do not need to wait for timer T313 to expire. However, this may led to premature warnings or trigger a high number of unnecessary primary carrier changes. To avoid this, $N_{WARN}$ can be set greater than N313, but this may cause the timer T313 to expire before $N_{WARN}$ consecutive CPHY-Out-of-Sync-IND are reached. This is more likely to happen when user equipment is performing DRx where it does not evaluate the sync quality and therefore does not send any synchronization primitives.

Alternatively, the radio link failure warning can be sent when the timer T313 exceeds a value $T_{WARN}$. $T_{WARN}$ is another timer that is started when T313 starts and has an earlier expiry time to that in timer T313. Both $T_{WARN}$ and T313 stop and reset at the same time. Since the T313 timer can be stopped and reset if N315 consecutive CPHY-Syn-IND primitives are received, using $T_{WARN}$ criteria, the radio link failure warning to the network can be cancelled if the radio link of the existing primary carrier recovers. In contrast, using the $N_{WARN}$ criteria does not allow the radio link failure warning to be cancelled.

In addition to provide a warning of a possible radio link failure, the radio link failure warning message should also indicate to the network which secondary carrier the user equipment believes would be the best replacement for the existing (failing) primary carrier since the user equipment performs regular measurements (e.g. on the pilot) of all secondary carriers.

The explicit radio link failure warning can be sent in one of two ways. The first is using an RRC message. Since RRC is at the higher layer, $T_{WARN}$ needs to be set such that it has sufficient time margin between $T_{WARN}$ and T313 for this message to reach the network and react upon it. The second is using a Reserved E-TFCI (E-DCH Transport Format Combination Indicator) using the E-DPCCH (E-DCH Dedicated Physical Control Channel). This is sent at the physical layer, which is faster than the RRC level allowing a fast reaction from the Node B. E-TFCI has a length of 7 bits and contains information required to decode uplink HSUPA data packets contained in the E-DPDCH (E-DCH Dedicated Physical Data Channel) but some E-TFCI are not used (i.e. reserved for future use) and so may be utilised to encode the radio link failure warning.

Figure 4:
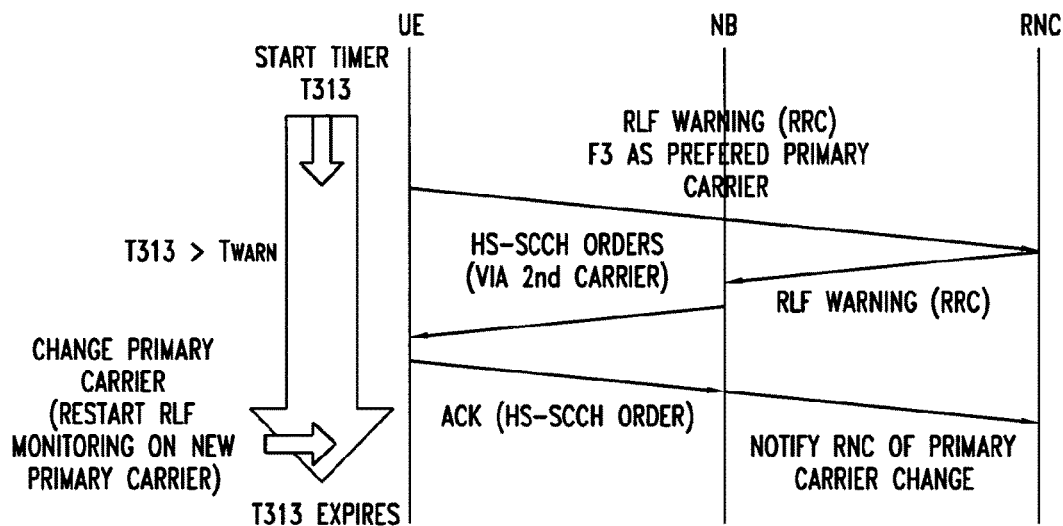
FIG. 4 is a signalling diagram of showing explicit radio link failure according to one embodiment.

FIG. 4 is a signalling diagram of the radio link failure avoidance scheme with explicit radio link failure warning using the $T_{WARN}$ criteria. The user equipment is configured with the following frequency carrier usage:

Frequency Carrier F1=Primary Carrier
Frequency Carrier F2=Secondary Carrier 1
Frequency Carrier F3=Secondary Carrier 2
Frequency Carrier F4=Not activated Here, the user equipment receives N313 consecutive CPHY-Out-of-Sync-IND primitives and starts the T313 timer. When T313 is greater than $T_{WARN}$, the user equipment sends a radio link failure warning via RRC signalling to the radio network controller. In this message the user equipment indicates that frequency carrier F3 is best suited as the new primary carrier based on its internal measurements. Upon receiving the radio link failure warning, the radio network controller informs the serving Node B for this user equipment. The Node B determines that frequency carrier F3 should be the new primary carrier and that frequency carrier F4 needs to be activated to sustain the downlink throughput. The Node B sends a HS-SCCH order via Secondary Carrier 2 (frequency carrier F3) to the user equipment with the following settings encoded in the order:

Frequency Carrier F1=Deactivate
Frequency Carrier F2=Secondary Carrier 1
Frequency Carrier F3=Primary Carrier
Frequency Carrier F4=Secondary Carrier 2

The user equipment receives the HS-SCCH order and sends an acknowledgement to the Node B. The user equipment then proceeds to configure its carriers to conform to that in the HS-SCCH order. The Node B, after successfully receiving the user equipment acknowledgement, will inform the radio network controller of the new carrier settings. When the user equipment successfully makes the changes to those in the HS-SCCH order (change primary carrier and activate frequency carrier F4 as a secondary carrier), it stops timer T313 and starts to monitor for possible radio link failure on frequency carrier F3 (the new primary carrier). The user equipment has, hence, avoided a radio link failure.

If the user equipment uses explicit radio link failure warning, the user equipment can wait for timer T313 to expire before executing the primary carrier change in the hope that the radio link of the existing primary carrier will improve thereby avoiding the need to change the primary carrier. This is shown in FIG. 3 where the user equipment executes the primary carrier change (if it has received a HS-SCCH order to do so) after timer T313 has expired. The user equipment needs to send a confirmation message to the radio network controller after the primary carrier change and in this case the Node B should not inform the radio network controller of any primary carrier change when it receives an acknowledgement from the user equipment. If the user equipment managed to restore its existing primary carrier, it needs to inform the radio network controller that it is sticking to the existing primary carrier. This method may reduce the number of primary carrier change in the user equipment but it may cause unpredictability in the network.

Implicit Radio Link Failure Warning

Although the network does not know whether user equipment is approaching radio link failure, the network receives measurements on each carrier from the user equipment. The network therefore is able to implicitly determine whether the primary carrier is deteriorating beyond a threshold and also is able to determine a suitable secondary carrier (if any) to replace the existing primary carrier. The measurements that can be used are as follows (either alone or in combination).

User equipment measurement reports may be used which indicate the quality of the CPICH of each carrier. This is at the RRC level (i.e. interpreted at the radio network controller) and the network may not respond fast enough. Furthermore, measurements on secondary carriers may need to be configured as inter-frequency measurements, which has less frequent updates and in some situation may not even be measured.

Channel Quality Information (CQI) may be used which indicate the throughput (transport block size) that the user equipment can support based on the quality of the radio link on each carrier. This is sent at the physical layer by the HS-DPCCH (High Speed Dedicated Physical Control Channel) for each carrier. The CQI is sent periodically and usually at a higher rate than that of the user equipment measurement reports. Since CQI is interpreted at the Node B, the Node B needs to make the decision whether to change the primary carrier. The user equipment can implicitly warn the Node B of a possible radio link failure by encoding that the CQI=0 for the primary carrier and sending this to the Node B even if the CQI for primary carrier is above zero. This can be sent when either $N_{WARN}$ or $T_{WARN}$ criteria is met (as described above in relation to explicit radio link failure). A CQI of zero usually indicates "Out of Range" except when the user equipment is configured with MIMO—Multiple-In Multiple-Out (where it indicates a support for an actual transport block size). However, it is unlikely that user equipment experiencing possible radio link failure will be in MIMO mode since MIMO requires very high quality radio link and the Node B knows whether the user equipment is using MIMO. An example CQI criteria is that the Node B counts the number of consecutive CQI=0 and, if it is above a threshold $N_{CQI}$, the Node B will execute a primary carrier change using an HS-SCCH order.

An implicit radio link failure warning (e.g. using CQI=0) is dependent upon the network's (e.g. Node B) ability to estimate that the user equipment is experiencing radio link failure. If the Node B is too slow in detecting a possible radio link failure (e.g. due to having a large $N_{CQI}$ threshold), the user equipment may declare radio link failure before a change of primary carrier is made. On the other hand, a Node B that executes a change in primary carrier too early may cause frequent unnecessary primary carrier changes. However, this prevents a potential radio link failure or even prevents the user equipment from having to start the T313 timer, which can potentially improve the overall throughput of the user equipment since the user equipment will always select a frequency carrier that is strong enough to be the primary carrier.

Figure 5:
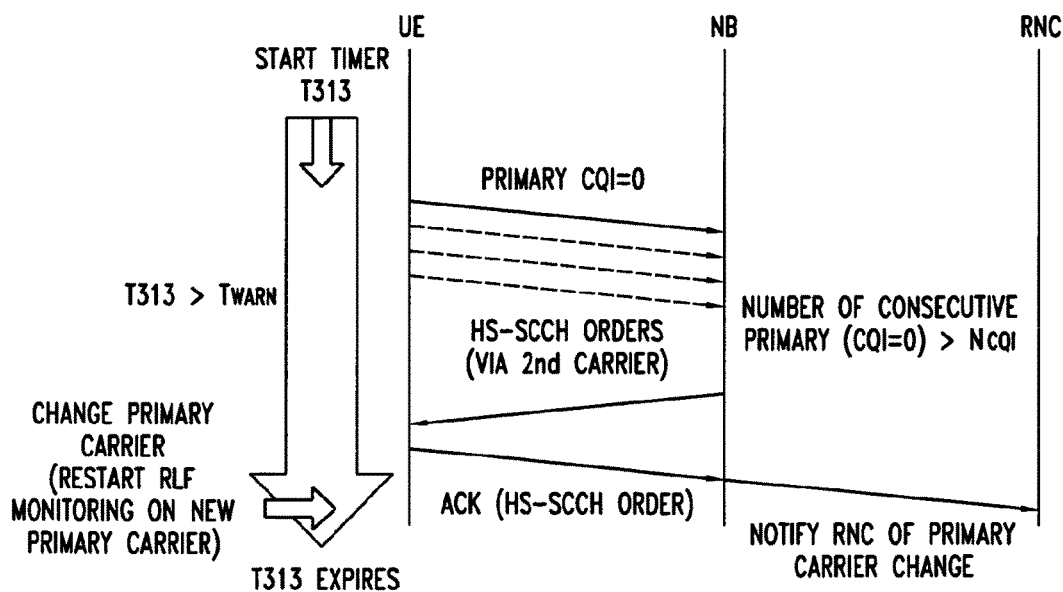
FIG. 5 is a signalling diagram of showing implicit radio link failure according to one embodiment.

FIG. 5 is a signalling diagram for an implicit radio link failure warning scheme using the $T_{WARN}$ criteria. The user equipment is configured with the following frequency carrier usage:

Frequency Carrier F1=Primary Carrier
Frequency Carrier F2=Secondary Carrier 1
Frequency Carrier F3=Secondary Carrier 2
Frequency Carrier F4=Secondary Carrier 3

The user equipment receives N313 consecutive CPHY-Out-of-Sync-IND primitives and starts the T313 timer. When T313 is greater than $T_{WARN}$, the user equipment keeps reporting CQI=0 for the primary carrier. Here MIMO is disabled. The Node B keeps count of the number of consecutive CQIs that are equal to 0 on the primary carrier. When this number reaches a threshold $N_{CQI}$, the Node B, based on CQIs on the secondary carriers, decides that frequency carrier F2 (Secondary Carrier 1) is best suited to be the next primary carrier. The Node B also decides that it needs to deactivate frequency carrier F4 (Secondary Carrier 3) due to load balancing. The Node B signals these changes via an HS-SCCH order using Secondary Carrier 1 to the user equipment by encoding the following:

Frequency Carrier F1=Deactivate
Frequency Carrier F2=Primary Carrier
Frequency Carrier F3=Secondary Carrier 1
Frequency Carrier F4=Deactivate The user equipment after successfully receiving the HS-SCCH order will send an acknowledgement to the Node B and proceed to make the necessary changes using pre-configuration information. The Node B upon receiving the acknowledgement from the user equipment will inform the radio network controller of these changes. The user equipment will then stop timer T313, thereby avoiding a radio link failure, and continues to monitor for possible radio link failure on frequency carrier F2, the new primary carrier.

Accordingly, it can be seen that the user equipment either explicitly or implicitly warns the network that its radio link connection is failing and may lead to a radio link failure. The network performs a fast primary carrier change via a HS-SCCH order (physical layer indication). The user equipment performs change of primary carrier and updates the network. It will be appreciated that different user equipment can have different frequency carriers as their primary carrier.

Fast Primary Carrier Change

Figure 6:
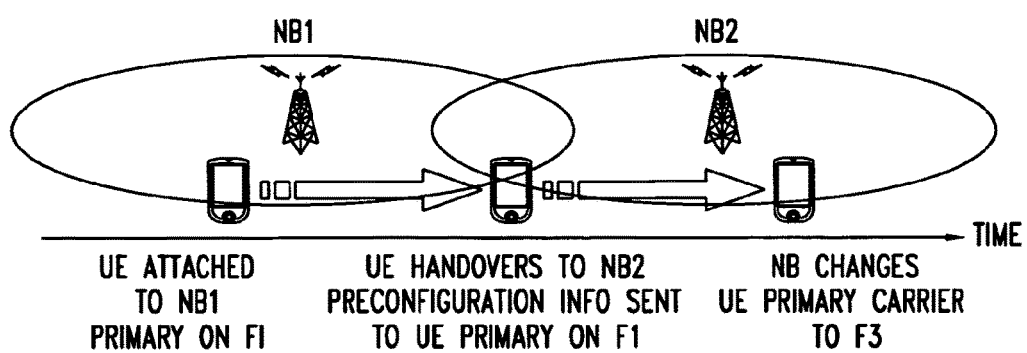
FIG. 6 illustrates fast primary carrier change according to one embodiment.

Fast primary carrier change using HS-SCCH orders can also be used for other purposes apart from avoiding radio link failure. As shown in FIG. 6, user equipment is initially attached to base station (Node B) NB1 with the following carrier settings:

Frequency Carrier F1=Primary Carrier
Frequency Carrier F2=Secondary Carrier 1
Frequency Carrier F3=Secondary Carrier 2
Frequency Carrier F4=Secondary Carrier 3

The user equipment then moves into coverage area of base station NB2 and performs a handover to base station NB2. The user equipment receives the pre-configuration information required to operate on all of the other frequency carriers (F1, F2, F3 & F4). As the user equipment moves around the coverage area of base station NB2, the load on frequency carrier F1 increases. However, frequency carrier F3 is lightly loaded. Base station NB2 decides that the essential control channels are better sent via frequency carrier F3. Hence, base station NB2 decides to change the user equipment's primary carrier from F1 to F3. To do this, the base station NB2 performs a fast primary carrier change via an HS-SCCH order using frequency carrier F3 with the following settings encoded in the order:

Frequency Carrier F1=Secondary Carrier 1
Frequency Carrier F2=Secondary Carrier 2
Frequency Carrier F3=Primary Carrier
Frequency Carrier F4=Secondary Carrier 3

The user equipment upon receiving the HS-SCCH order will acknowledge it and change its primary carrier to F3. The base station NB2 upon receiving the user equipment's acknowledgement will inform the radio network controller of the change. In this example, the original primary carrier on F1 is not deactivated. An order from a secondary carrier is understood as a change in primary carrier to that secondary carrier.

Hence, it can be seen that user equipment may send an explicit radio link failure warning to the network using either $N_{WARN}$ or $T_{WARN}$ criteria using either RRC signalling or a reserved E-DPCCH. Alternatively, user equipment can send implicit radio link failure warnings using the CQI (by setting it to zero) using either $N_{WARN}$ or $T_{WARN}$ criteria. A fast primary carrier indication by the Node B can be effected using existing HS-SCCH orders. Base stations inform the radio network controller of a change in primary carrier at the user equipment (or user equipment can inform the RNC). User equipment is preconfigured to operate the primary carrier in any of the configured frequency carriers (i.e. existing secondary carrier). In this way, a rapid change in primary carrier can occur without risking a call being dropped or an unacceptable degradation in service occurring.

Figure 7A:
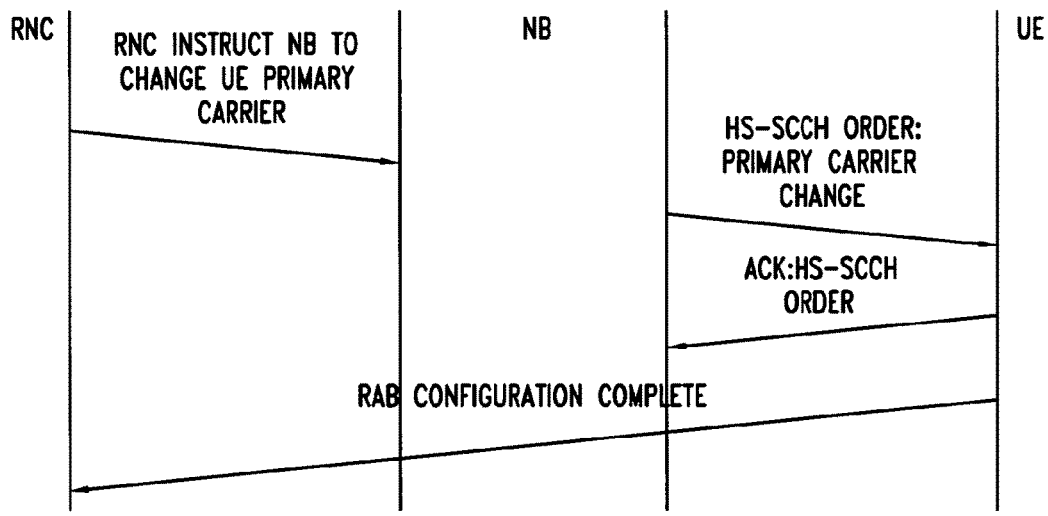
FIG. 7a is a schematic signalling diagram illustrating a signalling method for use in a potential radio link failure scenario according to one embodiment.

FIG. 7a is a schematic signalling diagram illustrating radio link failure according to one embodiment. In this embodiment, when an RNC 40 determines, or is informed, that a UE 50 requires a change in primary carrier it is operable, rather than using an RRC procedure, sent to the UE, to send a message to the Node B (base station) 20 to, in turn, instruct the base station to issue an HS-SCCH order to the UE 50. Upon completion of the required reconfiguration to change the primary carrier, the UE 50 is operable to send a "RAB configuration complete" message to the RNC.

In this embodiment, the RNC 40 is the instigator of the primary carrier change procedure. Such an arrangement removes the possibility that the base station autonomously issues an HS-SCCH order to the UE instructing a change in primary carrier, without the network generally being aware of such a change. Ensuring the network retains visibility of changes in primary carrier mitigates the chances of synchronisation loss and ensures each base station in an active set of a UE can be kept up to date regarding the chosen primary carrier. Further more, since the RNC retains control of the primary carrier changes, it will not send a conflicting configuration message to the UE until it receives a RAB configuration complete from the UE. The RNC & Node B remain aligned regarding the mobility status of a given UE.

As shown in FIG. 7a, RNC 40 determines that UE 50 needs to perform a Primary Carrier change based on RRC measurement information from the UE. Rather than initiating an RRC procedure, for example, Radio Bearer Reconfiguration procedure, which informs the UE to perform a Primary Carrier change, the RNC triggers a new NBAP message to the serving base station currently hosting the primary carrier for the UE. The NBAP message instructs the base station to send an HS-SCCH order to the UE. The HS-SCCH order informs the UE to perform a Primary Carrier change. Since the RNC instigates the procedure, it is operable to wait until it receives an indication from the UE, for example, an RAB configuration complete message, that reconfiguration of the UE is complete before it initiates any other RRC procedures to that UE. Thus both the base station 20 and RNC 40 remain synchronised with respect to the state of a given UE.

Figure 7B:
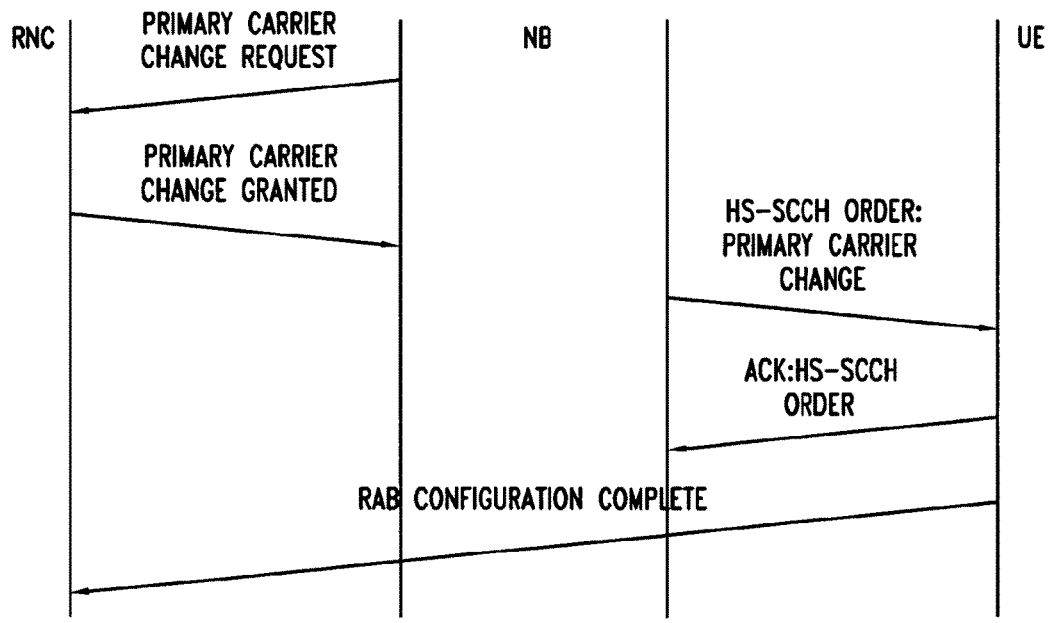
FIG. 7b schematic signalling diagram illustrating a signalling method for use in a potential radio link failure scenario according to one embodiment.

FIG. 7b is a schematic signalling diagram illustrating radio link failure according to one embodiment. In this embodiment, the base station requests a primary carrier change from the RNC 40. The base station 20 waits for a response from the RNC before sending an HS-SCCH order to the UE 50. The HS-SCCH order instructs a change the primary carrier being used by UE 50. This embodiment has an advantage over the embodiment shown in FIG. 7a in that the base station 20 is typically in possession of up to date information in relation to the radio condition of the UE (for example, from CQI reports) and can thus make a quicker determination of when a primary carrier change may be required in comparison to the RNC. The RNC is typically reliant on receiving RRC measurement reports from the UE, and those measurements may take some time to be delivered to the RNC, by which time changing primary carrier may be too late.

As shown in FIG. 7b, base station 20 decides that UE 50 is required to perform a primary carrier change. The base station 20 makes that decision based on a determination of the radio conditions experienced by the UE, as reported back by messages from the UE. The base station 20 sends an NBAP request to RNC 40, requesting that the RNC instruct the performance by the UE of a primary carrier change. In the embodiment shown, the RNC grants the request of the base station and informs the base station accordingly. Base station 20 initiates the transmission of an HS-SCCH order to the UE. Since the Node B initiated a request to the RNC, and the RNC subsequently gets an indication from the UE that the reconfiguration is complete, both RNC and base station remain in synchronisation with respect to the state of the UE.

Figure 7C:
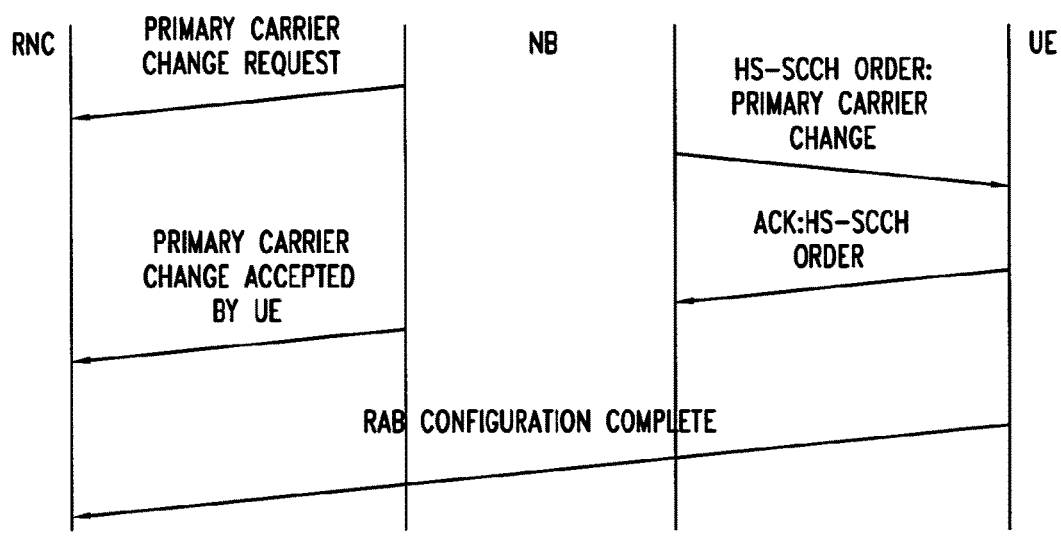
FIG. 7c schematic signalling diagram illustrating a signalling method for use in a potential radio link failure scenario according to one embodiment.

FIG. 7c is a schematic signalling diagram illustrating radio link failure according to one embodiment. In a third embodiment, as shown in FIG. 7c, the base station 20 is operable to notify RNC 40 that it wishes to transmit an HS-SCCH order to UE 50. In this embodiment, the base station does not wait for a response from RNC 40 before sending that order. Such an arrangement removes the delay whilst the base station waits for the RNC response (present in the embodiment shown in FIG. 7b). Once base station 20 has notified RNC 40, it proceeds to perform a primary carrier change via an HS-SCCH order. UE 50 acknowledges the HS-SCCH order to base station 20. In turn, base station 20 indicates the acknowledgement to RNC 40, thus allowing RNC 40 to propagate the change in primary carrier implemented by UE to the non-serving cells belonging to the active set of UE 50. Upon completing reconfiguration to change the primary carrier, UE 50 sends a RAB configuration complete message to the RNC. Since the RNC has received a notification of primary carrier change, it is configured such that it does not send any conflicting configuration messages to the UE for a predetermined period, or until it receives a RAB configuration complete message from UE 50.

As shown in FIG. 7c, base station 20 decides that UE 50 needs to perform a primary carrier change based on its determination of the radio conditions from the UE. The base station sends an NBAP indication to RNC 40 that it is about to instruct UE to perform a primary carrier change. Base station 20 issues a HS-SCCH order to UE 50 and when the UE responds by acknowledging receipt of that order, base station 20 sends an additional indication to the RNC 40. UE 50 also indicates to RNC 40 that it has performed a reconfiguration by sending an RRC RAB configuration complete to the RNC. Since the RNC is aware that the base station has initiated a HS-SCCH order it waits until it gets the indications from both the base station and UE that the reconfiguration is complete before it initiates any other RRC procedures to that UE. Hence both the base station and RNC remain synchronised with respect to the state of the UE.

Embodiments shown in FIGS. 7a, 7b and 7c allow the RNC and base station to maintain synchronisation on the mobility status of the UE when the network needs to instruct the UE to perform a primary carrier change. Without such a procedure there is the risk that the RNC and base station lose synchronisation which can lead to Radio Link failure on the base station, resulting in a significant drop in the potential downlink data throughput to the UE. A loss of synchronization between RNC and base station can result in the issuance of contradictory instructions which can in turn result in complete radio link failure.

Radio Link Failure Signalling

In some multi-carrier systems, for example, 4C-HSDPA systems, a base station may be unable to order UE to make a change to its primary carrier. In such systems, only the RNC is operable to configure UE to change its primary carrier. Consequently, any radio link failure (RLF) warning message sent by UE needs to reach RNC 40. One method is for UE to send a RRC message to the RNC. However, in such a signalling method, base station 20 remains unaware of the RLF Warning, acting simply to route the message from UE to RNC, rather than decode any part of it. It can be beneficial for a base station to know if possible radio like failure of a primary carrier, since base station 20 performs the scheduling for the multi carrier network and the RRC message from the RNC to change the primary carrier may be sent to UE via the primary carrier which is experiencing RLF. If the primary carrier change instruction is sent on a carrier experiencing radio link failure UE may not receive the primary carrier change instruction and is hence unable to avoid the radio link failure. A problem to solve is to design signalling methods to avoid this issue.

In some embodiments, part of a radio link failure warning signaling process transits, or terminates at, a base station 20. UE may only evaluate possible radio link failure for the primary carrier since it is on that carrier that control and mobility commands are based and failure of such a carrier is critical to the operation of the UE. Accordingly, if a radio link failure warning is sent by UE 50 then the primary carrier is likely to be in very poor radio condition. If base station 20 is made aware that the UE may go into radio link failure it can operate to stop routing packets to UE 50 via the primary carrier, with the result that RRC messages from RNC 40 are not sent via the primary carrier. Signaling associated with implementations of embodiments depend upon whether a radio link failure warning generated by UE 50 is sent via a RRC or Layer 1/MAC message (both of which can be decoded by a base station).

RRC messages are usually slow since they are typically long and have to reach the RNC. It can therefore be advantageous, as described previously, to send a radio link failure message via Layer 1 or using a MAC message. Such messages terminate at a base station, enabling the base station to be aware of an impending radio link failure.

Whether it is a base station or RNC which is operable to instruct a change to the UE primary carrier, it is important that the relevant network node is aware of which secondary carriers could be candidates for use as a new primary carrier. The UE itself is typically in the best position to evaluate the signal quality of all its downlink carriers. Accordingly, it is best placed to provide a recommendation to the RNC or base station regarding which secondary carrier to use as a new primary carrier and the signal quality (eg CQI) of this secondary carrier or carriers.

During normal operation, a base station receives frequent Channel Quality Indicator (CQI) updates in relation to each carrier from the UE. However, UE typically stops sending CQI feedbacks if it moves into the radio link failure evaluation process illustrated in FIG. 3.

In one embodiment, a base station is operable to use the last CQI feedback received from user equipment 50 to determine autonomously which secondary carrier to route the primary carrier change order comprising either an RRC message or an HS-SCCH order. The last CQI feedbacks may, however, not be representative of the radio condition currently being experienced by user equipment since there is a delay between the UE shutting off its transmitter and a base station routing a primary carrier change command. In some embodiments, the UE is also operable to provide a secondary carrier recommendation to a base station or RNC as part of a radio link failure warning. That radio link failure warning message may be sent using a Layer 1 or MAC message. A radio link failure message transmitted using Layer 1 can be explicit or implicit as described above.

In the case of explicit signalling described above, in some embodiments, a reserved E-TFCI scheme cannot contain sufficient bits to carry a secondary carrier recommendation and an Uplink Order Request may be used instead in some embodiments.

In the case of implicit signalling described above, in some embodiments it is proposed to transmit a CQI=0 repeatedly to the base station. In order to signal a recommended secondary carrier, UE sends a feedback CQI=0 for all carriers other than the recommended secondary carrier. In some embodiments, a recommended secondary carrier is indicated by sending, in respect of the recommended secondary carrier, a CQI=31 (highest CQI value).

Figure 8:
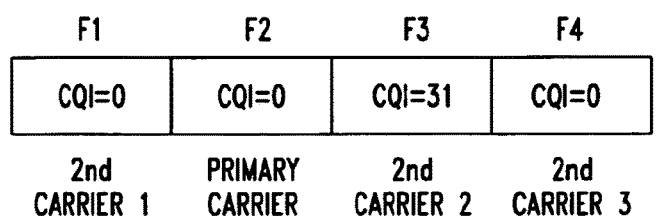
FIG. 8 is a schematic illustration of an implicit radio link failure message according to one embodiment.

FIG. 8 is a schematic illustration of an implicit radio link failure message according to one embodiment. As illustrated, frequency F1 is operating as secondary carrier 1, F2 is operating as primary carrier, F3 is operating as secondary carrier 2 and F4 is operating as secondary carrier 3. The implicit radio link failure message shown in FIG. 8 indicates that the recommended carrier is secondary carrier 2 which has a CQI=31 whilst the other carriers have been allocated a CQI=0. The illustration of FIG. 8 is a logical representation of the implicit radio link failure message including CQI feedback. The actual feedback carried by the HS-DPCCH (High Speed Dedicated Physical Control Channel) has a different bit format.

It will be appreciated that in an alternative embodiment, it is possible to indicate, using appropriate values of CQI, a ranking indicating the suitability of each of the secondary carriers as a replacement primary carrier.

In embodiments, if there is no secondary carrier that can act as the primary carrier, the radio link failure warning is still sent since it is possible that the RNC can instruct handover of the UE to another cell. A base station according to one embodiment can decide that an implicit radio link failure warning is sent if there is a lack of feedback from the UE to the base station after a predetermined time period. Silence for a predetermined time period may be indicative that a UE is experiencing possible radio link failure, since a UE experiencing radio link failure typically shuts off its transmitter when it enters radio link failure evaluation. This type of implicit warning may, however, result in incorrect messaging since an absence of feedback may not indicate an impending radio link failure. Furthermore, in such an embodiment, it is not possible for the UE to recommend a secondary carrier to be used as the new primary carrier.

Depending on the settings of $T_{WARN}$ and $N_{WARN}$ criteria in the radio link failure evaluation method shown in FIG. 3, UE 50 may recover from a loss of synchronization after sending a radio link failure warning. In such a case, UE 50 is then operable to feedback a valid HS-DPCCH (one without CQI=0) to a base station 20.

Reception of a normal HS-DPCCH message from UE 50 at a base station after that UE has sent a radio link failure warning message indicates that UE 50 has recovered from imminent radio link failure. If recovery occurs before the RNC has sent a primary carrier change order, the base station becomes aware that the UE has recovered and is able to receive on the primary carrier. In embodiments, a base station sends a HS-SCCH order to change the primary carrier, the reception of a valid HS-DPCCH prior to the sending of an HS-SCCH order results in the base station 20 cancelling, for example, by never sending, the HS-SCCH order.

FIGS. 9 to 15 illustrate various signaling methods used when a UE sends a radio link failure warning message directly to an RNC via RRC message and/or to a base station via a Layer 1/MAC message.

Radio Link Failure Using RRC Message

According to one embodiment, user equipment 50 sends a radio link failure warning as an RRC message. That message is sent directly to RNC 40 bypassing the base station 20. That is to say, the base station does not decode the RRC message which passes through it from user equipment to the RNC. In such an embodiment, the RNC operates to inform the base station of the radio link failure warning. The signaling methods for RNC initiated primary carrier change and base station initiated primary carrier change are described.

Figure 9:
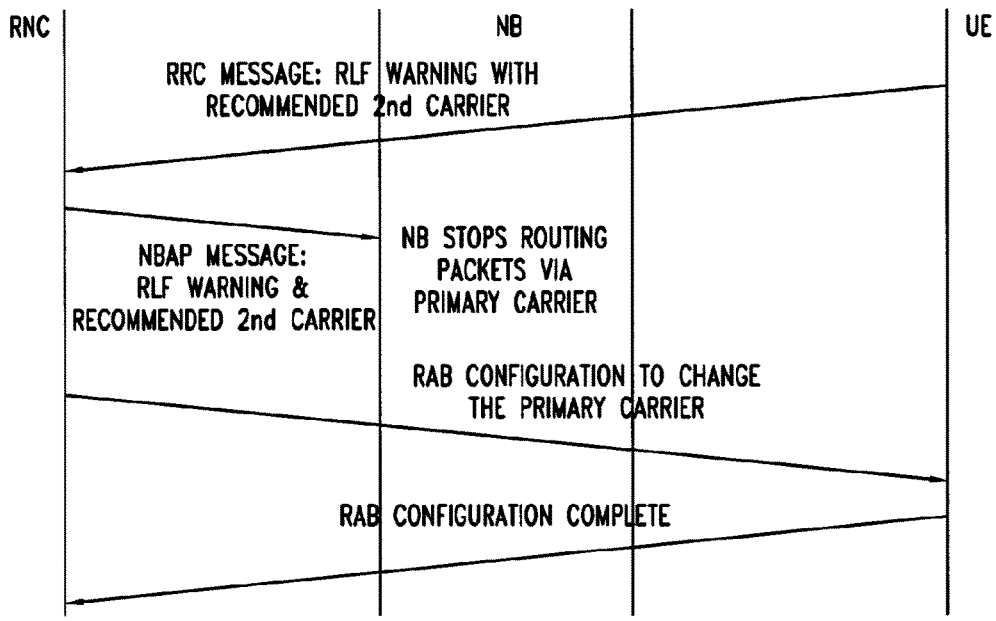
FIG. 9 is a schematic signalling diagram illustrating radio link failure according to one embodiment.

FIG. 9 illustrates schematically the signaling for a scenario in which an RNC 40 initiates a primary carrier change. Upon receiving a radio link failure warning from the UE, the RNC informs the base station of a radio link failure warning for this UE via an NBAP message. The NBAP message also contains an indication of the UE recommended secondary carrier. When the base station receives the NBAP message from the RNC, it stops scheduling packets on the primary carrier unless it receives (from the UE) a HS-DPCCH message indicating good CQI on the primary carrier. The RNC then proceeds to send a RRC message to the UE to change its primary carrier. This message can be routed via a secondary carrier (for example, as recommended by user equipment 50 as a replacement primary carrier) instead of the current primary carrier. In some embodiments, the RNC and base station are operable to route a primary carrier change message via a carrier other than that recommended as a primary carrier by the UE.

Figure 10:
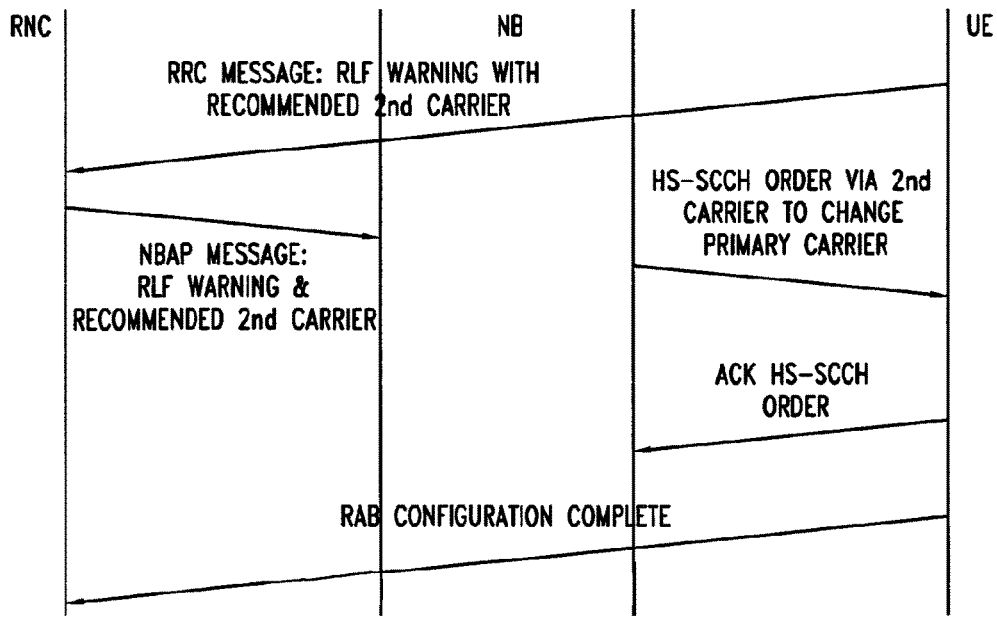
FIG. 10 is a schematic signalling diagram illustrating radio link failure according to one embodiment.

FIG. 10 illustrates a signaling scheme in which a base station 20 is operable to Itself initiates a primary carrier change, for example, by use of a HS-SCCH order (or a layer 1 order). In the embodiment shown, UE 50 is pre-configured to operate the primary carrier in any configured carriers. Upon receiving a radio link failure warning from UE in relation to the current primary carrier, the RNC informs the base station 20 of an occurrence of a radio link failure warning for the UE via a NBAP message. This NBAP message also contains an indication of the UE recommended secondary carrier. The base station 20 then sends a HS-SCCH order to the UE instructing a change to the primary carrier. The order is sent via a secondary carrier (for example, the secondary carrier recommended by the UE). The UE acknowledges receipt of the HS-SCCH order and also informs the RNC that the primary carrier configuration change is complete.

Radio Link Failure Warning Via Layer 1 or MAC Layer

In some embodiments, a radio link failure warning is sent to a base station using a Layer 1 or MAC message, which terminates at a base station. Signaling methods for RNC and base station initiated primary carrier changes are described.

Figure 11:
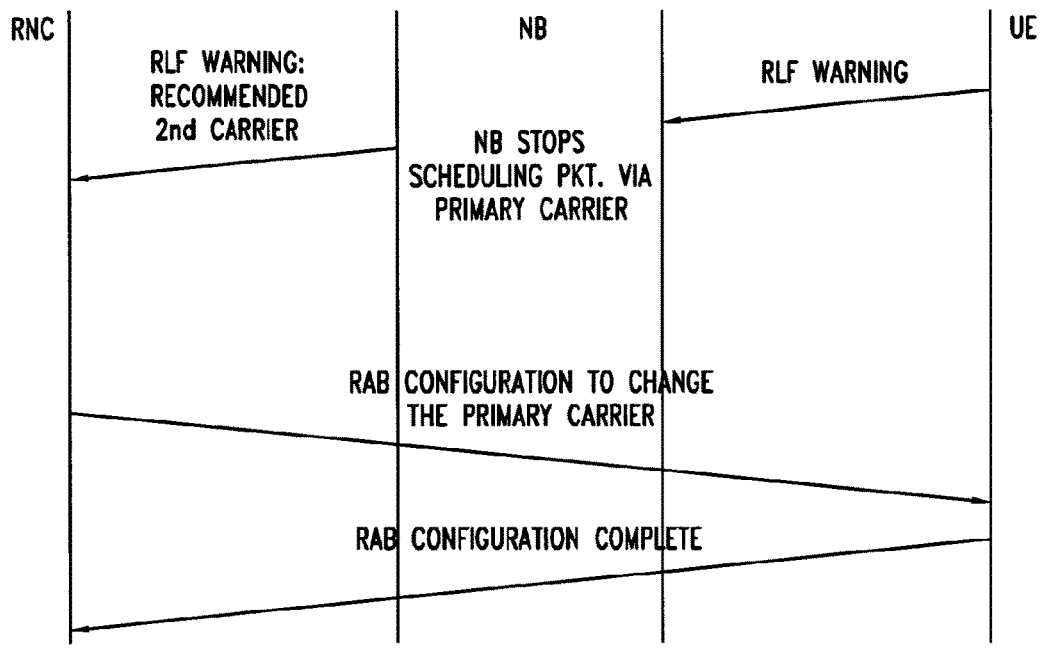
FIG. 11 is a schematic signalling diagram illustrating radio link failure according to one embodiment.

FIG. 11 illustrates a signaling method in which the RNC initiates the primary carrier change. In the illustrated embodiment, the base station 20 receives a radio link failure warning from user equipment 50 and informs the RNC 40 via a NBAP message. In the NBAP message, the base station also recommends the best secondary carrier that can be used as the new primary carrier, based upon UE recommendation. The recommendation need not match the UE recommendation and can, for example, be a combination of the information provided by user equipment 50 in conjunction with an algorithm implemented by a base station.

In embodiments in which base station initiates the primary carrier change, the base station 20 informs the RNC 40 of the radio link failure warning upon receiving it from the UE 50. As described previously, the base station 20 can be operable either to wait for a response from RNC 40 before changing the UE primary carrier (as illustrated in FIG. 12) or proceed to change the UE primary carrier without waiting (as illustrated in FIG. 13).

Figure 12:
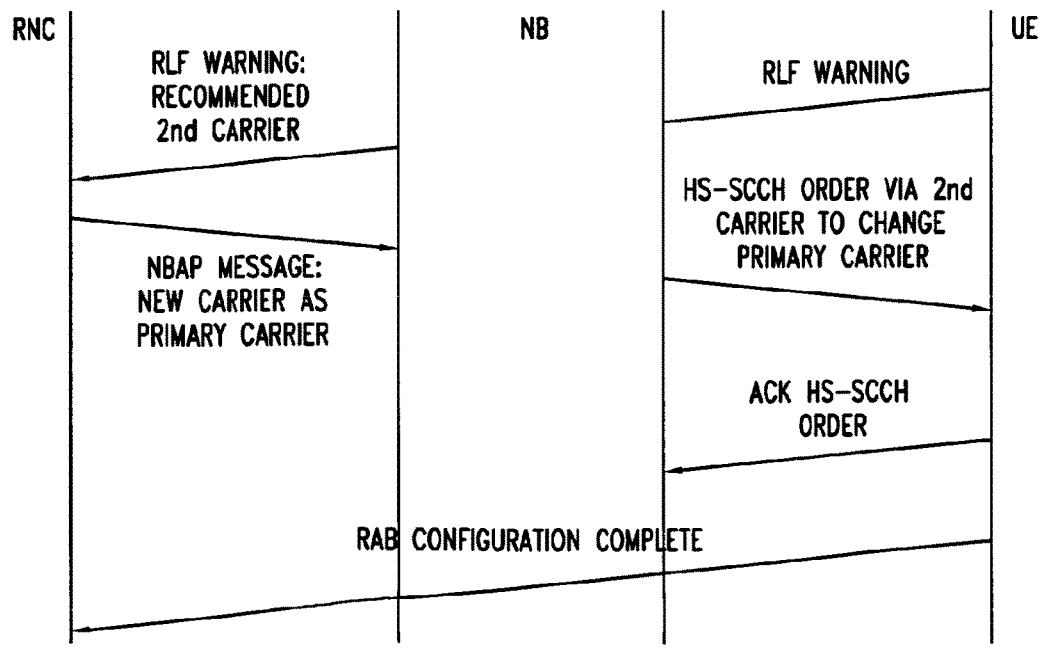
FIG. 12 is a schematic signalling diagram illustrating radio link failure according to one embodiment.

In accordance with the embodiment shown in FIG. 12, the base station 20 informs RNC 40 of a radio link failure warning and a recommended secondary carrier. The base station waits for the RNC 40 to decide whether a primary carrier change is required. According to such an embodiment, the RNC retains control over the UE 50 and it is possible that RNC 40 can decide to handover the UE to another cell rather than change its primary carrier, in which case the handover command (to another cell) may be sent via the recommended secondary carrier. In FIG. 12, the RNC orders the base station to instruct a change the UE primary carrier and also indicates the secondary carrier that it wishes to be the new primary carrier. The base station sends an appropriate order in the form of an HS-SCCH order to the UE. The UE acknowledges the HS-SCCH order and confirms the primary carrier configuration to the RNC.

If the base station 20 waits for confirmation from the RNC 40 as shown in FIG. 12, the primary carrier change may be slow and the delay in waiting for a confirmation may cause the UE to declare radio link failure in the interim, thus disrupting the user service.

Figure 13:
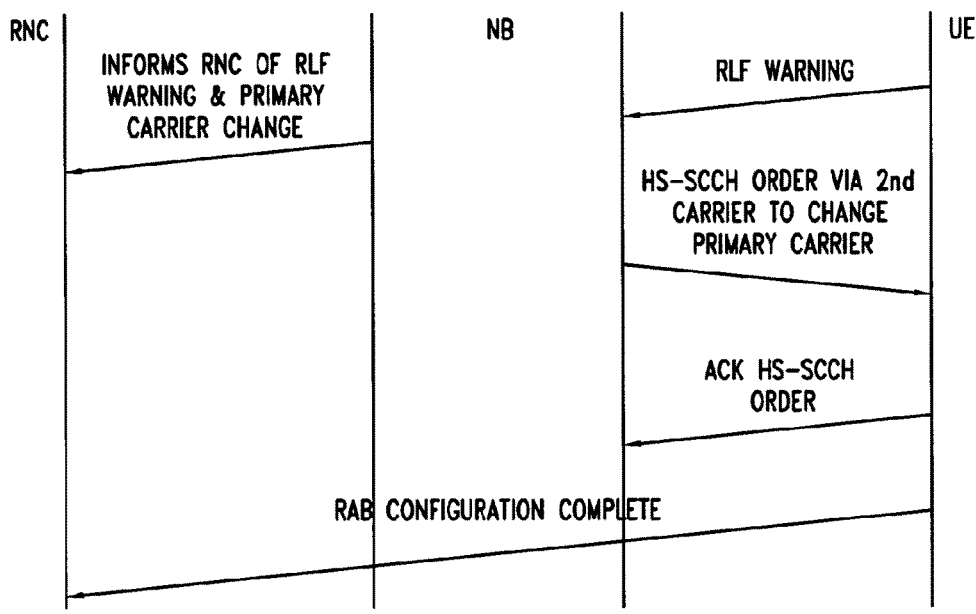
FIG. 13 is a schematic signalling diagram illustrating radio link failure according to one embodiment.

In accordance with the embodiment shown in FIG. 13, base station 20 proceeds to change the UE primary carrier after informing the RNC without wailing for a RNC feedback. Since the base station 20 is in control, it can cancel the primary carrier change if it subsequently discovers that the UE has recovered its primary carrier, for example on receipt of a valid HS-DPCCH from a UE. If the base station wishes to cancel the primary carrier change, it also informs the RNC, thereby ensuring the RNC retains visibility of primary carrier changes.

Figure 14A:
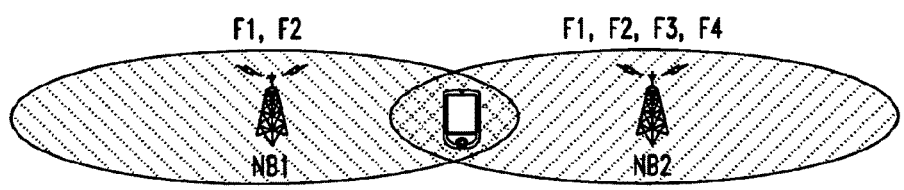
FIG. 14a illustrates primary carrier change according to one embodiment.

In FIG. 14*a*, a UE is attached to a base station, NB2. The UE 50 is located in an overlapping region of coverage between base stations NB1 and NB2. NB1 operates only in frequency F1 and F2 whilst NB2 operates in 4C-HSDPA with F1, F2, F3 and F4. The UE primary carrier is F1 and Secondary Carrier 1 (SC1) is F2, Secondary Carrier 2 (SC2) is F3 and Secondary Carrier 3 (SC3) is F4. Since NB1 also operates in F1 and F2, the UE experiences higher interference in F1 and F2 and to a point where the UE loses sync on its primary carrier in F1. The UE moves into RLF evaluation and sends a RLF Warning using a Layer 1 or MAC message to the NB with SC2 as the recommended secondary carrier best suited as the new primary carrier. In this illustrated example, only the RNC is able to change the primary carrier of the UE and signalling as shown in FIG. 11 is executed to instruct the UE to change its primary carrier from F1 to F3.

Figure 14B:
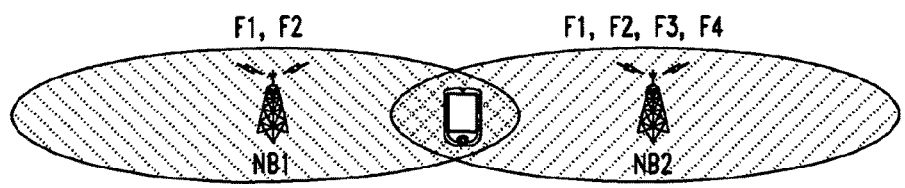
FIG. 14b illustrates primary carrier change according to one embodiment.
Figure 15:
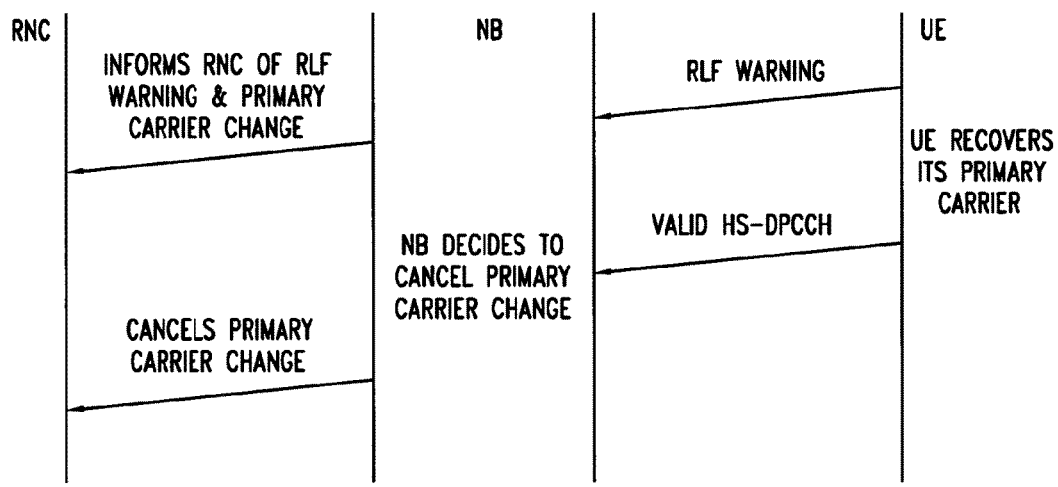
FIG. 15 is a schematic signalling diagram illustrating radio link failure according to one embodiment.

In FIG. 14*b* a UE is attached to NB2 at the overlapping region of coverage between NB1 and NB2. As in FIG. 14*a*, NB1 operates in F1 and F2 whilst NB2 operates in 4C-HS-DPA with F1, F2, F3 and F4. F1 is the primary carrier. Similar FIG. 14*a*, the UE primary carrier deteriorates and the UE moves into RLF evaluation. The UE sends a RLF Warning using Layer 1 or MAC message with F3 (Secondary Carrier 2) as the recommended secondary carrier best suited to be the new primary carrier.

According to this example, the NB is able to initiate the primary carrier change. The NB informs the RNC of the change in primary carrier as described in FIG. 15. The UE moves further into NB2 and this causes the interference from NB1 on the primary carrier (F1) to reduce and the UE recovers its primary carrier. The UE then sends HS-DPCCH feedback as in normal operation. The NB receiving the valid HS-DPCCH decides to cancel its primary carrier change. It then informs the RNC of this cancellation. The UE continues to use F1 as its primary carrier.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling communication between a first network node and a second network node in a multicarrier wireless communications system in which a predetermined set of a plurality of carriers are utilized to support communication between said first network node and said second network node, said predetermined set of said plurality of carriers comprising a primary carrier and at least one secondary carrier, said method comprising:
the second network node warning the first network node of a possible radio link failure by encoding that a channel quality information equals zero for the primary carrier even if the channel quality information for the primary carrier is above zero;
indicating to a third network node that a physical layer instruction is to be transmitted between the first network node and the second network node; and
transmitting the physical layer instruction from the first network node, said physical layer instruction encoding reselection information to cause said second network node to select a different carrier from said plurality of carriers as a new primary carrier;
wherein said physical layer instruction encodes reselection information to cause said second network node to select a predetermined carrier from said set of said plurality of carriers as said new primary carrier.

2. The method according to claim 1, further comprising determining an occurrence of an event requiring a change in said primary carrier;
wherein said determining comprises receiving a notification of said event from said second or third network node.

3. The method according to claim 1, wherein said indicating occurs prior to said step of transmitting.

4. The method according to claim 1, wherein said indicating comprises requesting to perform said transmitting step.

5. The method according to claim 3, further comprising awaiting the physical layer instruction to perform said transmitting step prior to said transmitting step.

6. The method according to claim 1, further comprising monitoring for an indication of safe receipt of said physical layer instruction.

7. The method according to claim 6, further comprising indicating to said third network node that the indication of safe receipt has been received.

8. The method of claim 1, wherein said physical layer instruction is transmitted using said new primary carrier.

9. The method of claim 1, comprising:
transmitting preconfiguration information to said second network node to enable said second network node to support communication using at least one other primary carrier.

10. The method of claim 1, wherein said determining the occurrence of the event comprises detecting a radio link failure.

11. A non-transitory computer-readable medium including computer readable instructions, which when executed by a processor, cause the processor to perform the method of claim 1.

12. The method according to claim 1, wherein:
the first network node is a base station;
the second network node is a user equipment; and
the third network node is a radio network controller (RNC).

13. A network node operable to control communication with a second network node in a multicarrier wireless communications system in which a predetermined set of a plurality of carriers are utilized to support communication between said network node and said second network node, said predetermined set of said plurality of carriers comprising a primary carrier and at least one secondary carrier, said network node comprising one or more processors configured to:
receive a warning from the second network node of a possible radio link failure, wherein the warning encodes that a channel quality information equals zero for the primary carrier even if the channel quality information for the primary carrier is above zero;
indicate to a third network node that a physical layer instruction is to be transmitted to the second network node; and
transmit the physical layer instruction, said physical layer instruction encoding reselection information to cause said second network node to select a different carrier from said plurality of carriers as a new primary carrier;
wherein said physical layer instruction encodes reselection information to cause said second network node to select a predetermined carrier from said set of said plurality of carriers as said new primary carrier.

14. A network node configured to communicate with a first network node in a multicarrier wireless communications system in which a predetermined set of a plurality of carriers are utilized to support communication between said network node and said first network node, said predetermined set of said plurality of carriers comprising a primary carrier and at least one secondary carrier, said network node configured to:
warn the first network node of a possible radio link failure by encoding that a channel quality information equals zero for the primary carrier even if the channel quality information for the primary carrier is above zero;
receive a physical layer instruction from said first network node, said physical layer instruction encoding reselection information to cause said network node to select a different carrier from said plurality of carriers as a new primary carrier;
wherein said physical layer instruction encodes reselection information to cause said network node to select a predetermined carrier from said set of said plurality of carriers as said new primary carrier.

* * * * *